United States Patent [19]

Barker et al.

[11] 4,373,664

[45] Feb. 15, 1983

[54] WALL THERMOSTAT AND THE LIKE

[75] Inventors: Charles E. Barker; Anthony C. Cairo; Frederick T. Bauer, all of Holland, Mich.; Auzville Jackson, Jr., Richmond, Va.

[73] Assignee: Robertshaw Controls Company, Richmond, Va.

[21] Appl. No.: 263,730

[22] Filed: May 14, 1981

Related U.S. Application Data

[60] Division of Ser. No. 116,959, Jan. 30, 1980, Pat. No. 4,319,711, which is a continuation of Ser. No. 840,582, Oct. 11, 1977, abandoned.

[51] Int. Cl.³ .................. F23N 5/20; G08B 23/00
[52] U.S. Cl. .................. 236/46 R; 340/527
[58] Field of Search .......... 364/557, 505; 236/46 R, 236/46 F, 78 R, 78 D; 165/12, 26; 340/309.3, 527

[56] References Cited

U.S. PATENT DOCUMENTS

| 3,038,106 | 6/1962 | Cutsogeorge et al. | 340/530 X |
|---|---|---|---|
| 3,706,339 | 12/1972 | Bartles et al. | 165/26 X |
| 3,730,819 | 5/1973 | Evalds | 165/26 |
| 3,844,475 | 10/1974 | Kesterson et al. | 236/1 EA |
| 3,891,144 | 6/1975 | Sadler et al. | 236/46 R |
| 3,948,441 | 4/1976 | Perkins et al. | 236/46 R |
| 4,206,872 | 6/1980 | Levine | 236/46 R |

Primary Examiner—William E. Wayner
Attorney, Agent, or Firm—Fulwider, Patton, Rieber, Lee & Utecht

[57] ABSTRACT

Apparatus is provided for a wall mounted thermostat to accept and convert manually generated instructions to binary encoded electronic impulses to control ambient air conditions in the environment in which the thermostat is located. The parameters of operation include a building heating control which reduces the desired ambient temperature at night, beginning at a prescribed time and returning to a higher daytime level at a different prescribed time. The system may also adjust desired temperature depending upon humidity conditions and alter the timing of heating and air conditioning control by predicting when a desired temperature will be reached in order to avoid overshoot. The system includes a liquid crystal or light emitting diode display and communicates with a power source and with heating and air conditioning switches such as relays or contactors.

9 Claims, 3 Drawing Figures

WALL THERMOSTAT AND THE LIKE

This is a division of application Ser. No. 116,959, filed Jan. 30, 1980, now issued as U.S. Pat. No. 4,319,711 which is a continuation of U.S. application Ser. No. 840,582 filed Oct. 11, 1977, now abandoned.

BACKGROUND OF THE INVENTION

1. Field of the Invention

The present invention relates to building heating and air conditioning thermostats of the type usually mounted on a wall to control the ambient air temperature.

2. Description of the Prior Art

Historically, building heating and air conditioning control has been performed by wall mounted thermostats. Such thermostats can be readily read to ascertain the actual temperature and a sliding scale or rotary dial is manipulated to alter the desired temperature. A temperature sensing element closes electrical contacts to turn on the heating or air conditioning unit when a predetermined temperature differential exists between actual temperature and desired temperature. The furnace or air conditioner is cut off by opening the contacts once actual temperature achieves the desired temperature to within a predetermined smaller tolerable limit.

With increasing concerns for energy conservation brought about by a progressive diminution of energy resources, more sophisticated temperature control systems have been made. For example, U.S. Pat. No. 3,948,441 describes a wall mounted thermostat in which provision is afforded to set time variable thermostat settings such as a lower night temperature and a higher daytime temperature as the desired temperatures. A clock is provided so that the target or desired temperature is automatically adjusted to the appropriate setting depending upon the time of day. The system described in the aforesaid patent provides for the timer or clock mechanism to be isolated from the line voltage and driven only from a rechargeable battery source. The battery source itself is charged at a very low rate by 24 volt 60 cycle current during the time the thermostat is off. This arrangement permits a thermostat having only two wires for control purposes to be retrofitted with a time variable energy saving thermostat that uses the same two wires for two purposes i.e. battery charging and thermostatic controlling of the heating system. Generally, because conventional wall thermostats use coiled bimetal strips for opening and closing electrical contacts to relays or contactors associated with the heating and air conditioning devices, sensitivity and thermal inertia are limiting factors to efforts to achieve better control.

In another current thermostat employing a digital clock, temperature sensing is provided by an epoxy-coated thermistor operated in a linear voltage versus temperature circuit. Comparison with reference settings in electronic amplifiers causes the appropriate heating or cooling element to be energized as conditions demand. Timing for relative temperature shifts between two alternative temperature levels is derived from a 60 hertz low voltage line obtained from an existing low voltage supply line. The return path is through an inactive heating/cooling relay element, or through an active relay element via a transformer in the case of a heat-only system.

SUMMARY OF THE INVENTION

The present invention provides a control to regulate ambient air conditions which has the capability of responding to and better controlling primarily the temperature comfort level. This flexibility and accuracy is achieved by providing increased levels of sophistication through use of computational capability and special techniques for initiating necessary control signals. The computational capability is provided by an arithmetic logic unit, a random access memory with stored arithmetic coefficients, a read only memory with program storage and associated random logic functions for proper control of the above elements. All of these elements are packaged into a unitary thermostat suitable for wall mounting which additionally contains a rechargeable battery power supply for powering the elements, a quartz crystal time base for supplying system timing, a display with drivers, selector switches, a temperature sensor and at least one power switch.

The invention provides an ambient air temperature regulating thermostat which may be wall mounted in place of a conventional thermostat and which may be sensitive to a number of different conditions to effectuate temperature control. In addition to regulating ambient air temperature to different settings at daytime and at night to conserve energy, the present invention is also able to predict within each cycle the time at which the target temperature will be reached, and to shut off the furnace or air conditioning unit prior to this time. Heated or cooled air already present in the heating or cooling system prior to shut off is circulated in the space to be heated or cooled, thus allowing the system to "coast" to the desired setting without overshooting the target temperature. Furthermore, a temperature signal accumulating or averaging delay is built into the system so that momentary air drafts do not activate unnecessary heating or cooling. Such air drafts frequently occur as a result of people moving through a room past a temperature control unit, doors opening and closing, irregular convection currents from fireplaces and so forth. Random access memory of the present invention stores sensed temperature information and the arithmetic logic unit performs averaging calculations to ascertain whether or not activation of a heating or cooling system is truly necessary.

The invention also provides a temperature regulating system which utilizes a rechargeable direct current power source that may be recharged from a conventional two wire thermostat system.

Still further, the invention provides a temperature regulation system with a digital display and with a keyboard input with which to effectuate manual commands. The digital display may take the form of a liquid crystal display or light emitting diode display or a display from other similar technology. The display is made possible due to the continuous provision of power from the battery. A keyboard input allows commands to be digitized at their source and in a manner familiar to many people. A single keyboard provides a universal input for multiple manual commands to the thermostat.

A binary coded decimal slide switch shall be the input means for either temperature set back or set forward with numbers provided as to the degrees of change. Both times and temperature can thereby be read into the control system of the present invention from a single input keyboard. Furthermore, selection of output devices and override controls are also provided in the form of slide switches. An ambient air regulating system can thereby be directed to heat, to cool, or to be shut off entirely. Similarly, a fan can be turned on continuously or the system can be directed to selectively operate the fan only during heating and cooling periods.

An additional feature of the invention is to have a built in minimum time duration of a temperature differential to prevent hunting by the system or too frequent operation thereof but at the same time achieve superior controlling. This prevents aggravation of recurrent cycling noise, reduces equipment wear and is especially important in preserving air conditioner compressor life.

It is to be understood that all of the operating parameters of the system can be adjusted at the factory. That is the system may be designed to maintain a temperature with two degree Farenheit differential preferred. Also the control may be required to maintain a minimum cyclical period of operation. That is, a heat pump may be forced to operate for at least ten minutes, and stay off for at least five minutes. The specific values of all such settings of these factors are engineering considerations and the preferred values can be varied as desired.

The improved control circuitry of the invention is adaptable to ascertain information as to whether or not the heating or cooling system employed is operating at an energy output sufficient to return actual temperature to the desired temperature setting, and to vary the energy output accordingly. When heating or cooling cycles do not change temperature in the direction desired, the energy output is too low and hence may be increased. This may be achieved by a multistage energy level system. In such a system, for example a two stage system, the control can from initial operation at one level of heating or cooling output determine that the other level of heating or cooling output is more desireable to obtain proper cycle timing. Thereafter, the system will operate at the other output stage until, from stored data, the arithmetic logic unit determines that the system should revert to the initial rate of heating or cooling. One possible critereon for changing stages of operation may be by a determination of temperature gradient with time to ascertain whether or not actual temperature moves toward desired temperature. If it does, the furnace or air conditioner may be operated at a lower stage of energy output. If it does not, a higher stage of energy is indicated. Stages of operation may be graduated in incremental adjustments, or the energy output control may be modulated on a continuous sliding scale, depending upon the manner of adjustment chosen and environmental equipment used.

A further optional feature of the invention is the flexibility to compensate for humidity variations in regulating heat output. The level of humidity in air effects the degree of comfort achieved by maintaining a particular temperature. By way of example, a temperature of 72° F. may be quite comfortable at 40% relative humidity. This same degree of comfort may be achieved by a somewhat lower temperature where the humidity is 80%, or a somewhat higher temperature may be required to achieve the same level of comfort with very dry air. The flexibility of the preset invention provides a capability to accept data from a humidity sensor and to modify the desired temperatures. That is, and continuing with the foreging example, if a temperature of 72° as a desired temperature is manually registered into the system using the keyboard, the control circuitry can treat this as the desired temperature at a preset standard of 40% relative humidity. If the humidity rises to 80%, instead of maintaining a temperature of 72°, the system might regulate heat generation to maintain a lower temperature until the humidity again drops. The converse would be true should the humidity fall.

The system is also flexible enough to accomodate dead band heating and cooling in a system employing both a furnace and an air conditioner. Should the ambient air temperature rise, for example, to a temperature above 72°, an overriding signal could be generated to prevent the furnace from being turned on. A temperature band might exist, for example, between 72° and 74° F. in which activation of both the furnace and air conditioning unit would be inhibited. Neither the furnace nor the air conditioner would be turned on while the temperature remained within this narrow dead band range. Above 74° the inhibit signal would be removed from the air conditioner, but would remain in effect with respect to the furnace. By the same token, below 72° the air conditioning unit would be inhibited while activation of the furnace is permitted. This manner of operation is optional and the function, as achieved with conventional thermostat controls, is explained in U.S. Pat. Nos. 3,040,807 and 3,961,237.

DESCRIPTION OF THE DRAWINGS

With reference to FIGS. 1 and 2, the face 10 of a control unit for the air temperature regulation system of the invention is depicted having a display 12, a keyboard 16 and selector switches 13. A cover plate 11 hinged along its lower edge and hides the keyboard 16 and some of the selector switches 13 from view when closed, as in FIG. 1, but when opened as in FIG. 2, allows access to the keyboard 16 and all of the selector switches 13 and displays written operating instructions printed on the interior surface thereof when display or alteration of settings is desired. The configuration of the regulating apparatus 10 is such that it may be conveniently mounted in any wall thermostat mounting location or on upright stanchions that are provided for this purpose in some buildings.

An electronic display 12 of four digit positions and a designation of A.M. and P.M. is provided in the upper left hand portion of the face 10 of the regulator. The display 12 is shown as a light emitting diode display which could be activated as desired but a liquid crystal display could alternatively be selected so as to draw as little power as possible to display a continuously observable image of numbers designating temperature in degrees. Temperature may be calibrated in the internal electronics of the system to present a two digit display in either Farenheit or centrigrade degrees. LCD, gas discharge or other conventional electronic displays might be employed in place of the LED display.

While the display 12 may always be illuminated unless the keyboard 16 is actuated, it must be appreciated that this need not be the case. For example, the selector switches labelled ROOM TEMP and TEMP SET are provided and the display 12 remains blank to conserve energy unless one of them is depressed. Depression of the ROOM TEMP button activates the display 12 and causes it to display the current temperature of the room in which the control unit is located. Display may be in either degrees Farenheit or degrees Centigrade. Depression of the TEMP SET button, on the other hand, causes the display 12 to register the normal room temperature maintained by the control unit of the invention. The set back temperature may be determined from a slide switch 17 which may be adjusted to provide a deviation from the normal room temperature setting of between plus and minus 10°. Again, the control unit may be arranged to operate on the basis of either degrees Farenheit or degrees Centigrade. Accordingly, one may ascertain the alternative or set back temperature by depressing the TEMP SET button, observing the display 12, and mentally calculating the difference according to the setting of the slide switch 17.

Figure 2:
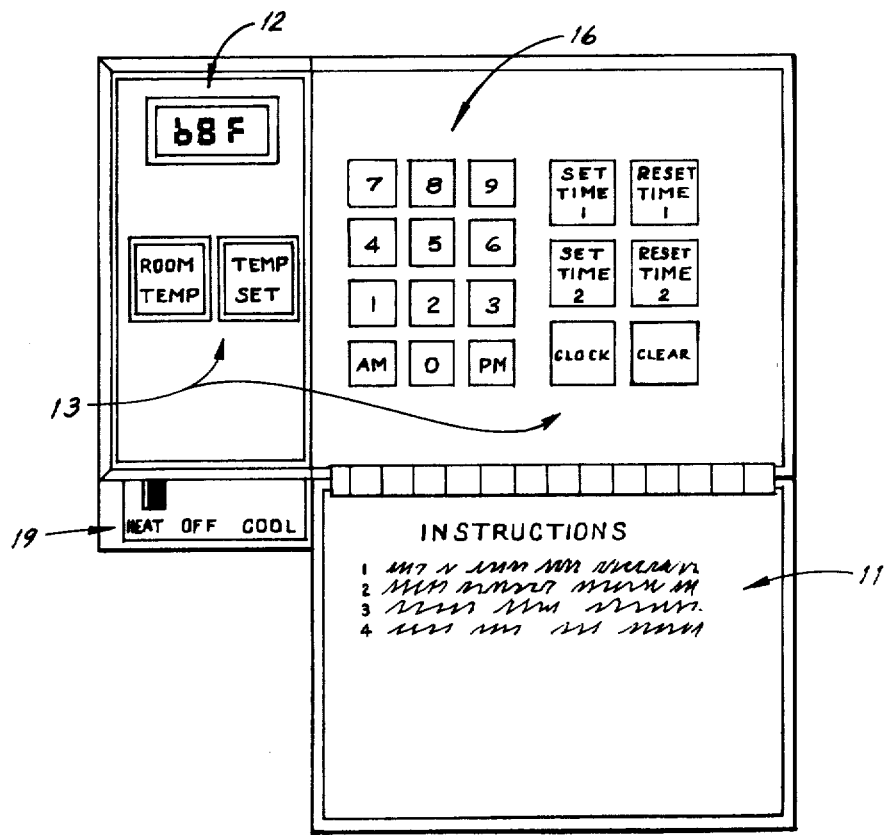
FIG. 2 is similar to FIG. 1 with the cover open.

The other selector switches 13, visible in FIG. 2, also perform predetermined functions. The switches labeled SET TIME 1 and RESET TIME 1 are used to control respectively the times within a 24 hour period at which the control unit of the invention first ceases to maintain the normal desired room temperature and begins to maintain an offset or setback temperature as determined by the setting of the slide switch 17 for a prescribed operating period and the time at the termination of that period when control reverts to the normal temperature. In some instances it will be desireable for the control unit to maintain the setback temperature throughout discontinuous periods of a 24 hour day. Accordingly, the selector switches labeled SET TIME 2 and RESET TIME 2 are provided to designate the second commencement and cessation of maintenance of the setback temperature by the control unit of the invention within a 24 hour period.

Depression of the SET TIME 1 button which the control unit first begins to maintain the setback temperature setting. This time appears in LED or LCD display 12. Depression of the RESET TIME 1 button similarly calls from memory the time thereafter at which the control unit of the invention will cease maintaining the setback temperature setting determined by the slide switch 17, and will instead revert to maintenance of the normal temperature. This time likewise appears as at display 12 in response to depression of the RESET TIME 1 button. In a similar manner, depression of the SET TIME 2 button, causes the display 12 to provide an image of a clock reading of a subsequent time during the day at which the control unit will again resume maintenance of the setback room temperature. The time at which control according to that setback temperature will again cease is registered on display 12 by depression of the RESET TIME 2 button. Depression of the CLOCK button provides a visual display at 12 of the current time. Depression of the CLEAR button clears the memory of the time or temperature last appearing on the display 12. Changes in normal room temperature setting are achieved by first depressing either the SET TIME 1 or SET TIME 2 buttons, and thereafter depression of selected ones of the keys in the keyboard 16 designating a new normal room temperature. Changes in the secondary or set back temperature are achieved by manipulation of the slide switch 17.

The control panel face 10 is also equipped with a slide switch 19 which may be utilized to alternatively operate either a furnace or an air conditioner by movement to the HEAT or COOL position respectively. When in the OFF position, the slide switch 19 prevents operation of either the furnace or the air conditioner.

The slide switch 21 is provided to control operation of a fan. The fan can be turned on continuously by movement of the switch 21 to the ON position. Air circulation and low level cooling can thus be achieved with a minimum power consumption. Alternatively, the slide switch 21 can be moved to the AUTO position in which the fan is cycled off and on with the air conditioner operation. When the switch 21 is in the ON position and when switch 19 is in the HEAT position, the fan will not be operable under the control of the central processor 24. Rather, the fan will be operated directly from the furnace in response to a bonnet temperature sensor.

It should be appreciated that other types of control functions can be provided for the control unit of the invention by using various slide or rotary switches in a similar manner.

Figure 3:
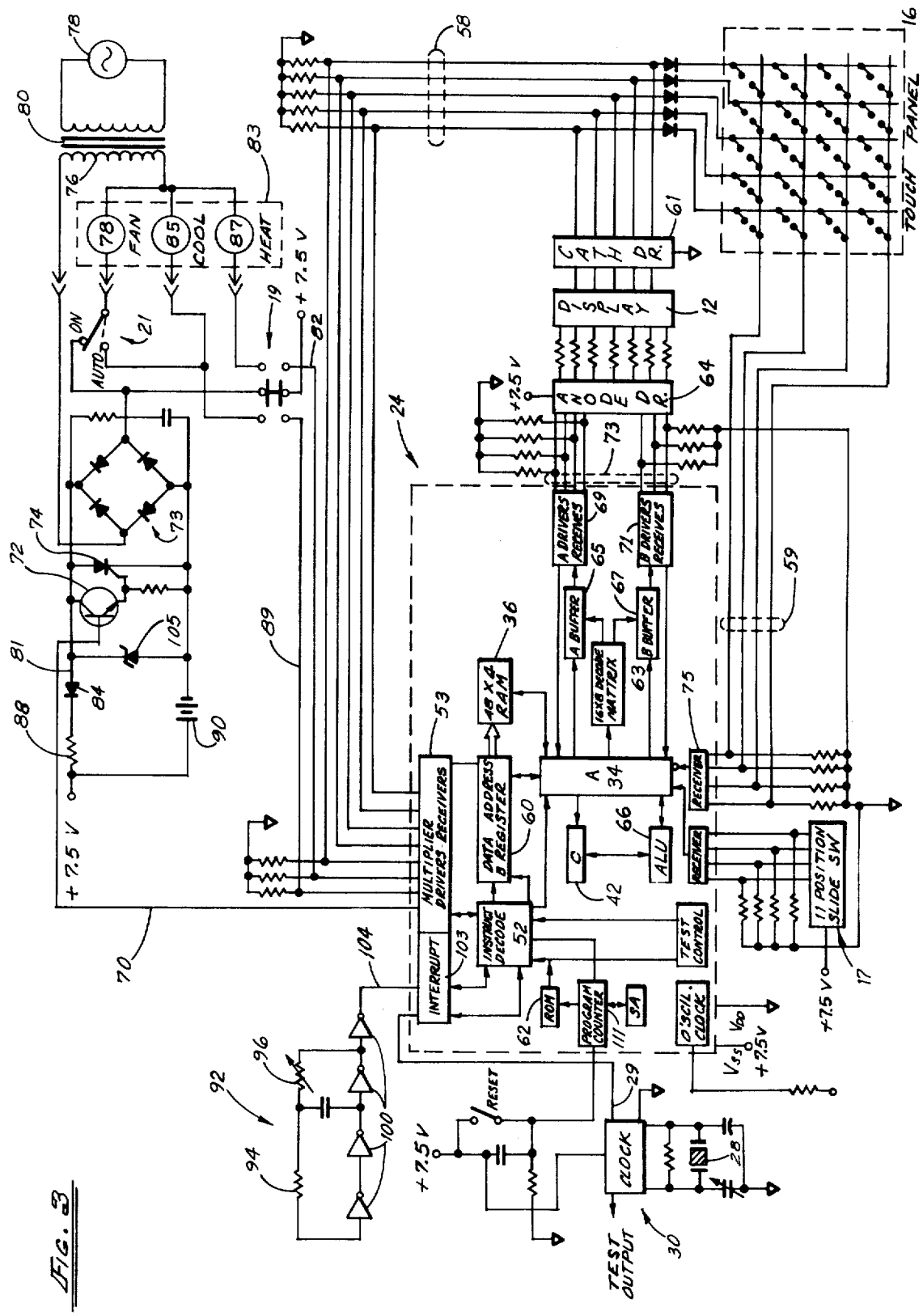
FIG. 3 is a block diagram illustrating the manner of operation of the embodiment of FIG. 1.

FIG. 3 illustrates the operational components of the temperature control system according to the present invention. In addition to the control panel face 10, a main central processing unit 24 is provided to perform the arithmetic computations and to effectuate the necessary encoding, decoding, storage and other data manipulation functions required for temperature control. The central processor 24 may take the form of a programmable microcomputer, or alternatively it may be a dedicated custom designed integrated circuit package. In either event, because of size and performance considerations, the central processor 24 must be entirely electronic and must function without electro-mechanical components. Different integrated circuit forms such as TTL, MOS, C-MOS, P-MOS and other integrated circuit logic may be employed. The most desireable integrated circuits should exhibit low power requirements for the semiconductor circuitry utilized. One suitable form of microcomputer which may be employed as the central processor 24 is the PPS-4/1 Microcomputer manufactured by Rockwell International Corporation. This microcomputer, with minor modification, can be arranged to perform the functions of the central processor 24.

The electronic clock circuit indicated at 30 may or may not be included as an integral part of the central processor 24, but in either event supplies clock pulses to a counter arrangement that divides down the output of a uniform pulse source. The raw clock pulse source is a 3.579545 megahertz quartz crystal oscillator indicated at 28. The output of the crystal oscillator 28 is divided down through flip-flop circuits or counter chips in the clock counter array 30 to provide an integral hertz output on line 29 for use by the central processor 24. This output is tested by the central processor 24 and if the signal is found to be true, a current time register section of the random access memory 36 is updated. In this way a continuous record of the current time is maintained at a known location within the random access memory 36.

The touch panel switches of the keyboard 16 are configured in a matrix format. A particular switch column is selected by one of the five digit select lines 58 which are connected to a multiplexer circuit 53, including appropriate drivers and receivers. Information concerning activation of any switches in a row of switches is determined through one of four row select line 59 and transmitted to an accumulator 34 in the central processor 24 where a test is made to determine if a switch is being activated.

From the muliplexer 53 a signal is transmitted sequentially upon each of the column select lines 58 to the touch panel 16 under the control of the instruction decoder 52, which also provides a corresponding signal to the accumulator 34. By sampling the receiver 75, the accumulator 34 is able to determine, for the particular column select line 58 enabled, which, if any, of the row select lines 59 is enabled. The accumulator 34 is thereby able to identify depressed keys in the keyboard 16. As governed by instruction decoder 52 and the data address register 60, the accumulator writes information from the keys of the keyboard 16 into the random access memory 36.

In response to activation of particular ones of the selector switches 13, the central processor 24 performs an appropriate servicing routine. The inputs from the touch panel 16 are required to complete the servicing routine if the temperature switching times or the desired normal temperature are to be altered.

Depression of any one of the selector switches 13, with the exception of the CLEAR switch, results in an image at the display 12. Outputs from the random access memory 36 to produce images on the display 12 are assembled in the accumulator 34 and dispatched to a 16 by 8 decode matrix circuit 63, which converts the time and temperature signals to be displayed from the binary coded decimal form in which they are stored to a seven segment code. The seven segment codes are transmitted to a pair of data buffers 65 and 67 where the proper digit segments are latched prior to selecting and latching the associated digit in the display 12 by activation of one of the cathode drivers 61 from one of the column select lines 58. The segment code is transferred from the buffer 65 and 67 to a pair of driver and receiver circuits 69 and 71, and then in amplified form on seven parallel inputs collectively indicated at 73 to annode drivers 64.

The display 12 is multiplexed at the same rate as is the keyboard switch matrix. The numbers for display are selected one position at a time, although the persistence illumination of the LED's or LCD's in the display 12 allows all of the numbers in the display to be viewed concurrently. The scanning cycle is continued repeatedly during normal operation of the control unit of the invention.

The address register 60 provides the accumulator 34 with information as to the locations within the random access memory 36 and the read only memory 62 where information is to be read or written. This allows the accumulator 34 to draw permanent coefficients from the read only memory 62 to calculate temperature change rates to determine which stage of heating or cooling should be utilized to perform calculations to anticipate when a desired temperature will be reached, and to shut off heating or cooling in advance so that there is no overshoot of this temperature. The provision of coefficients by read only memory 62 through the instruction decoder 52 allows the accumulator to perform averaging functions to prevent the system from being actuated in response to transient drafts from air currents. Other means can be used to achieve the averaging function such as an R-C filter or some other hardware filtering arrangement. This forms a means for suppressing response to misleading transitory excursions of sensed temperature from average actual zone temperature. The address register 60 also provides the accumulator with address identification information to allow the accumulator to draw information from the random access memory 36 and pass this information through driver circuitry 64 for display in LED or liquid crystal display 12, as previously explained. An arithmetic logic unit 66 and a carry flip-flop 42 are also necessary to perform the temperature differential and averaging calculations necessary for the control functions to be performed.

The arithmetic logic unit 66 and the carry flip-flop 42 are used in conjunction with accumulator 34 to determine the predicted time of return of the actual temperature to the desired temperature in response to operation of the furnace contact 87, the air conditioner contacter 85 and fan contacter 78, all denoted generically as a thermal pump 83, and for responsively terminating generation of an actuating signal on line 70. The thermal pump 83 may be any device for heating or cooling ambient air in a closed environment and includes such devices as central furnaces, air conditioners and heat pumps. To terminate a signal on line 70, a temperature gradient is derived from a thermister 92 during provision of the signal on line 104. The predicted time at which actual temperature will coincide with desired temperature at the rate of incremental temperature gradient is calculated by the arithmetic logic unit 66 and the carry flip-flop 42. This interval is stored in the random access memory 36 and is continuously updated until a predetermined interval prior to the calculated predicted time. The signal 70 is then immediately terminated to compensate for thermal inertia of the thermal pump 83.

Figure 1:
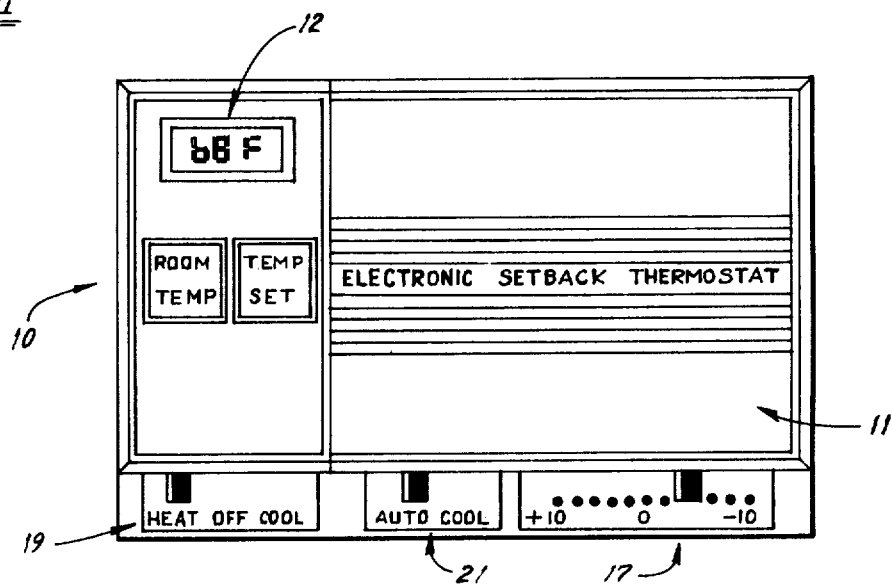
FIG. 1 illustrates the control panel of one embodiment of the invention with the cover closed on the keyboard.

The drive signal for controlling the physical activation and deactivation of the heating and air conditioning units is provided on line 70. A common output control is provided for both heating and cooling. The control circuit consists of both an SCR 74, an associated gate drive transistor 72 and a diode bridge 73. The SCR 74 is used for both heating and cooling by means of the two pole slide switch 19, depicted in FIG. 3 and also visible in the lower right hand portion of the control unit face 10 in FIGS. 1 and 2. One side of the contacts of the slide switch 19 connects the proper actuator control circuit for the air conditioner contacter 85, the furnace contacter 87 or the fan contacter 78, to the SCR 74 while the other side of the contacts provides a logic signal to the central processor 24, either on line 82 for heating or on line 89 for cooling.

When the proper temperature setpoint is reached, the central processor 24 latches line 70 to 7.5 volts. This voltage provides drive current to the base of gate drive transistor 72 which in turn drives the gate of SCR 74. The diode bridge 72 is used to provide full wave rectified voltage for operating the SCR 74 and gate drive transistor 72.

The signal on line 70 is transmitted to the base of the transistor 72 which provides the necessary amplification to gate the SCR 74. Gating of the SCR 74 opens and closes the transformer secondary circuit indicated generally at 76 which is conventionally a step-down loop of 24 volts A.C. derived from the 115–120 volt 60 cycle power source 78 acting through the transformer 80. Opening and closing of the secondary loop 76 provides power to the air conditioner and furnace contacters 85 and 87 respectively. When the contacter 85 closes a circuit to the furnace, the thermal pump 83 is operated in the heating cycle and when the contacter 87 closes a circuit to the air conditioner the thermal pump 83 is operated in the cooling cycle.

While three lines 70, 82 and 8 are employed between the central processor 24 and the SCR control circuitry, it should be noted that only two lines would be necessary to interconnect the transformer secondary loop 76 with the central processor 24 in a system employing a thermal pump 83 designed only for heating. This allows the temperature regulating circuit of the present invention to be utilized with conventional two wire thermostat connection lines for use with existing furnace installations which do not also include central air conditioning.

A further feature of the invention is the provision of power from the secondary loop 76 to the central processor 24 on the clock circuit 30 at all times whether or not the SCR 74 is conducting. In the operation of the invention, a trickle charge to recharge the rechargable battery 90 which powers the central processor 24 is derived from the electrical current tap 81 from the secondary loop 76 of the transformer 80. Power is supplied on the current tap 81, which draws current of a very low level, for example about 4 miliamps. The current from the transformer 80 is rectified by diode bridge 72 and passed through a diode 84 and a resistor 88 to charge a conventional nickel-cadmium rechargable battery 90. A zener diode 105 acts as a transient circuit protector. In addition, the current from diode 84 is passed at all times to power the clock circuit 30, and to the central processor 24.

A thermistor circuit 92 is comprised of fixed and variable resistors 94 and 96 respectively, a capacitor 98, and amplifiers 100. The output of the thermistor circuit 92 is connected as a data input source on line 104 to the accumulator 34 of the central processor 24 through an interrupt circuit 103 and an instruction decoder circuit 52. The thermistor circuit 92 may be located anywhere within the area of temperature regulation but is most conveniently located directly beneath or behind the face 10 of the control unit. In some applications, a coiled nickel resistance wire may be substituted for the thermistor circuit 92 in order to achieve more linear temperature signaling characteristics. The variable resistor 96 of the thermistor circuit 92 derives actual ambient temperature information and transmits a signal indicative of the actual temperature on line 104 to the accumulator 34, where it is translated into binary form.

If the accumulator 34, in cycling through a routine of temperature checks, ascertains that the actual temperature, as transmitted to it on line 104 is at sufficient variance with the desired temperature stored in a location in the random access memory 36 identified by the clock 30, the accumulator 34 sends a signal on line 70 to gate driver transistor 72 to gate the SCR 74. Prior to initiation of any signal on line 70, however, the system first ascertains that the temperature deviation is not a result of a transient draft. This function is achieved by sampling the output of actual temperature on line 104 over an interval determined by the clock circuit 30. A comparison is performed on the two temperatures obtained using parameters derived from the read only memory 62. If the calculations carried out by the arithmetic logic unit 66 and the carry flip-flop 42 show that an average minimum threshold temperature deviation does exist, a signal is initiated on line 70 to gate the SCR 74.

The embodiment of the invention depicted in FIG. 3 illustrates but a single stage of operation for a furnace and a single stage of operation for an air conditioner within the thermal pump 83. It should be understood, however, that the system depicted in FIG. 3 could be modified to provide a second control signal line in which a signal is provided on a line parallel to the line 70. The one of the parallel control signal lines actuated could be determined in accordance with the results of a temperature gradient calculation, again possibly performed by the arithmetic logic unit 66 and the carry flip-flop 42. If the calculated temperature gradient derived from temperature sensed by thermistor circuit 92 were to show that the operation of the thermal pump 83 had failed to move actual temperature toward desired temperature, the signal on one of the control lines could be provided to operate a higher energy contactor, instead of the lower energy contactor which would otherwise be actuated by a signal on the other parallel control line in such a two stage contactor system. This would drive the furnace or air conditioning unit to provide energy at a greater rate than would occur if the temperature gradient calculations were to show the temperature increasing, in the case of heating, or decreasing in the case of air conditioning, in response to signals from the thermistor circuit 92.

The clock 30 causes the accumulator 34 to access different areas of the random access memory 36 at different times of the day in order to determine the desired temperature. Thus, the accumulator 34 will compare average actual temperature from the thermistor circuit 92 with the regular desired temperature stored in random access memory 36 following the time designated. Conversely, once the designated set back time has been reached, the accumulator 34 will perform its comparisons on the lower set back desired temperature designated by the slide switch 17 and stored in those areas of the random access memory 36 corresponding to the times of day falling after the designated set back time and before the regular desired time designated.

Operation of the control unit of the invention is carried out in accordance with the instructions on the inside of the cover plate 11, visible in FIG. 2. An occupant of the room in which the control unit is located may easily perform certain inquiries to determine temperature information. Depression of the ROOM TEMP selector switch 13 will cause the accumulator 34 to access the RAM 36 and provide the current room temperature, at a designation F. for Farenheit or C. for Centigrade, to appear on the display 12. The image of the current numerical reading of the temperature remains for a few moments for a time determined internally by the central processor 12. To ascertain what the normal temperature setting is, one need merely depress the TEMP SET selector switch 13. A similar image will appear on the display 12 to provide information as to what the normal temperature setting is. During periods when the control unit is maintaining ambient temperature at the normal desired temperature, the two temperatures appearing in response to depression of the ROOM TEMP and TEMP SET selector switches 13 should be very close, and usually will be identical. During periods when the control unit maintains the ambient air at the set back temperature, as determined by the selector switch 17, the readings in response to depression of the ROOM TEMP selector switch and the TEMP SET selector switch should differ by exactly the amount specified by switch 17.

By opening the cover 11, one can perform further inquires and alter time and temperature settings. The clock 30 of FIG. 3 should be set to accurately maintain the correct time within the random access memory 36. To ascertain the time stored as the current time in random access memory 36, one need merely depress the CLOCK selector switch 13. In response thereto, the accumulator 34 will read the current time from the random access memory 36 and provide a visual image of a clock reading, including a suffix A for A.M. or P for P.M. on the display 12. If this reading is incorrect, the CLEAR select switch 13 should be depressed. This removes the previously stored reading from the random access memory 36. It is then necessary to reset the accurate time by the sequential depression of the proper numerical keys in the keyboard 16, followed by depression of the AM or PM key. When this has been done, the display 12 will automatically register the new current time. The CLOCK selector switch 13 is depressed a second time, thus terminating the subroutine.

To inquire of the control unit as to the earliest time of the day at which temperature will be controlled according to the setback temperature setting, determined by the switch 17, the SET TIME 1 switch is depressed. This will access from the random access memory 36 the earliest time within a 24 hour day at which the control unit will cease to maintain the normal desired temperature and will begin to maintain the setback temperature. If this is, in fact, the desired time at which the setback temperature is to be maintained, the SET TIME 1 button is again depressed and the image of the clock reading of the setback temperature disappears from the display 12. If one would thereafter like to change the time at which setback temperature will commence, the clear switch is depressed instead of depressing the SET TIME 1 switch a second time. This clears the previously set commencement time. Following depression of the CLEAR switch, a new time is entered by depressing numerical keys in the keyboard 16 in the proper order, followed by depression of the AM or PM designation key. This enters the altered commencement time of the setback temperature in the random access memory 36. This new time then appears on the display 12. Thereafter, the SET TIME 1 button is depressed again to store the information entered.

The RESET TIME 1 button alters the cessation time of the first interval within a 24 hour day during which ambient temperature is maintained at the setback temperature setting. Alteration of the reset time of the first setback temperature interval is achieved in much the same way as alteration of the commencement of that interval. That is, the RESET TIME 1 switch is depressed, thereby providing an image on the display 12 at which the first setback temperature interval is to terminate. To change this time, the CLEAR switch is depressed and thereafter a new time designation is entered on the keyboard 16. This new time designation appears on the display 12, and if it is correct, that time is stored as the new reset time by again depressing the RESET TIME 1 button.

Similarly, a second time interval during the day can be altered. By way of example, a typical normal temperature setting might by 72° F., while a set back temperature might be 68° F. A preferrable time interval for the setback temperature setting might well be from 8:00 A.M. to 5:00 P.M. These times could be designated using the SET TIME 1 and RESET TIME 1 switches respectively. A second interval of the day during which the setback setting of 68° might be desired could be from 10 P.M. to 6:30 A.M. The SET TIME 2 and RESET TIME 2 switches can respectively be used to establish these time demarkations. If the normal temperature is to be 72°, the slide switch 17 is set on −4° since 68° is 4° less than 72°. To change the time of the second setback temperature interval from commencement at 10 P.M. and termination at 6:30 A.M. to commencement at 11:15 P.M. and termination at 7:00 A.M., the following steps are taken. The SET TIME 2 switch is depressed, thereby producing an image of 1000P on the display 12. The clear switch is depressed to remove this image. The keys 1,1,1,5 and PM in the keyboard 16 are then depressed in that order. A corresponding image 1115 appears on the display 12. The SET TIME 2 switch is depressed to store this as the new commencement time for the second setback temperature interval. The RESET TIME 2 button is then depressed, thereby producing an image 630A on the display 12. This image is removed by depression of the clear switch. The new desired time is entered by sequentially depressing the buttons 7,0,0 and AM in that order to produce a corresponding image 700A in the display 12. The RESET TIME 2 switch is again depressed thus storing this time as the termination time of the second normal temperature interval.

If it is desired to change the normal temperature setting, the TEMP SET switch is depressed, thus providing an image of the normal desired temperature on the display 12. If this temperature is 72° F., and it is desired to change the normal desired temperature to 74° F., the CLEAR switch is depressed following depression of the TEMP SET switch. This clears the image from display 12. The numerical keys 7 followed by 4 are depressed in that order on the keyboard 16. The new normal desired temperature 74° F. appears on the display 12. This information is locked in storage by again depressing the TEMP SET switch which removes the image from the display 12. If the slide switch 17 remains at the −4° setting, the secondary or set back temperature will no longer be 68° F., but instead will be 70° F., since 70° is 4° less than 74°.

It should be understood that numerous additional features can easily be incorporated into the present invention. For example, a humidity sensor can additionally be employed to alter the normal desired temperature in response to humidity deviations. Also, it is possible to arrange the device so that there is an automatic change over from air conditioning to heating upon reaching a predetermined temperature, with a dead band within which neither heating nor cooling will occur so that alternative cycling between heating and cooling cannot result. In addition, an outside temperature sensor can be employed to adjust various parameters of the device, including the normal desired temperature. Also, as previously noted, multiple stages of heating and cooling can be employed, typically through the use of parallel connected SCR's or triacs. In such multiple stage operation, failure of the system to effectuate the desired temperature change, either heating or cooling, in response to a signal on line 70, would advance the system to a higher stage of energy operation. That is, the energy output, either heating capability or cooling capability would be increased.

A further desireable feature might be a manual emergency bypass. That is, if ambient temperature conditions fall an unacceptable level due to some malfunction of the control unit or some other event, the control provided by the control system of the invention could be overriden and controlled by a simple single temperature control. This feature could be used to prevent freezing of water pipes and other adverse consequences.

It is to be understood that numerous other variations and modifications of the system will become readily apparent to those skilled in the art. Accordingly, the invention should not be construed as limited to the embodiments disclosed herein, but rather is defined in the claims appended hereto.

What is claimed is:

1. An ambient air unitary self contained wall thermostat comprising:
   ambient air temperature sensing providing analog signals indicative of actual temperature in an enclosed zone;
   analog to digital conversion means for converting said signals indicative of actual temperature to binary encoded form;
   means for storing a desired temperature in binary encoded form;
   means for manually entering said desired temperature into said means for storing;
   means for comparing said binary encoded signals indicative of actual desired temperatures and for providing an actuating signal to a heating or cooling source to conform said actual temperature to said desired temperature;
   means for selectively suppressing response to prevent misleading transitory excursions of sensed temperature from average actual zone temperature; and
   means responsive to the provisions of said actuating signal for determining the predicted time of coincidence of said actual temperature with said desired temperature in response to operation of said heating or cooling source and for responsively terminating generation of said actuating signal.

2. Apparatus according to claim 1 wherein said means for determining the predicted time of coincidence of said actual temperature and said desired temperature further comprises:
   temperature gradient determining means coupled to said temperature sensing means for determining incremental temperature gradient during provision of said actuating signal,
   means connected to said temperature gradient determining means and to said means for storing for calculating the predicted time at which actual temperature will coincide with said desired temperature at the rate of said incremental temperature gradient, and
   means for terminating said activating signal prior to said predicted time to compensate for thermal inertia of said heating or cooling source.

3. Apparatus according to claim 1 wherein said means for suppressing response by preventing the provision of said actuating signal includes buffer storage means interposed between said analog to digital converter and said means for comparing, said buffer storage means for accumulating successive ones of said signals indicative of actual temperature to provide an output to said means for comparing indicative of an average of actual temperature over a prescribed interval of time.

4. Apparatus according to claim 1 further comprising: temperature averaging means interposed between said temperature sensing means and said means for comparing, said temperature averaging means for averaging a plurality of successive temperature signals from said temperature sensing means and for enabling said means for comparing to provide said activating signal when average actual temperature deviates from said selected desired temperature by more than a predetermined allowable limit.

5. Apparatus according to claim 1 further characterized in that said means for selectively suppressing response to misleading transitory excursions, includes clock means for designating sampling times, and for actuating said ambient air temperature sensing means for computing a mean ambient air temperature from said binary encoded analog signals indicative of actual temperature provided at said sampling times, whereby said means for comparing said binary encoded signals provides an actuating signal when said ambient air temperature deviates from said desired temperature.

6. Apparatus according to claim 5, further comprising means for storing a maximum allowable deviation between mean ambient air temperature and desired temperature, whereby said means for comparing provides an actuating signal only when said mean ambient air temperature deviates from said desired temperature by at least said maximum allowable deviation.

7. Apparatus according to claim 1 further characterized in that said means for selectively suppressing response to misleading transitory excursions determines direction and cumulative magnitude of departure of sensed temperature from average actual zone temperature over a prescribed interval of time.

8. A wall thermostat comprising:
   ambient air temperature sensing means providing analog signals indicative of actual zone temperature in an enclosed zone,
   analog to digital conversion means for converting said signals indicative of actual temperature to binary encoded form,
   means for storing a desired temperature in binary encoded form,
   means for manually entering said desired temperature into said means for storing,
   means for comparing said binary encoded signals indicative of actual and desired temperatures and for providing an actuating signal to a heating or cooling source to conform said actual temperature to said desired temperature, and
   means responsive to the provision of said actuating signal for determining the predicted time of coincidence of said actual temperature with said desired temperature in response to operation of said heating or cooling source and for responsively terminating generation of said actuating signal.

9. Apparatus according to claim 8, wherein said means for determining the predicted time of coincidence of said actual temperature and said desired temperature further comprises:
   temperature gradient determining means coupled to said temperature sensing means for determining incremental temperature gradient during provision of said actuating signal,
   means connected to said temperature gradient determining means and to said means for storing for calculating the predicted time at which actual temperature will coincide with said desired temperature at the rate of said incremental temperature gradient, and
   means for terminating said actuating signal prior to said predicted time to compensate for thermal inertia of said heating or cooling source.

* * * * *